United States Patent
Sumino et al.

(10) Patent No.: US 7,742,990 B2
(45) Date of Patent: Jun. 22, 2010

(54) COMMUNICATION CONTROL METHOD IN CONNECTION-ORIENTED COMMUNICATION, RELATED TRANSFER DEVICE, AND BILLING MANAGEMENT DEVICE

(75) Inventors: Hiromitsu Sumino, Yokosuka (JP); Hideharu Suzuki, Yokohama (JP); Taku Onishi, Yokohama (JP); Toshiyasu Yabe, Yokohama (JP); Ai Nagai, Sagamihara (JP)

(73) Assignee: NTT DoCoMo, Inc., Tokyo (JP)

( * ) Notice: Subject to any disclaimer, the term of this patent is extended or adjusted under 35 U.S.C. 154(b) by 1534 days.

(21) Appl. No.: 10/507,791

(22) PCT Filed: Mar. 25, 2003

(86) PCT No.: PCT/JP03/03609

§ 371 (c)(1),
(2), (4) Date: Sep. 13, 2004

(87) PCT Pub. No.: WO03/084156

PCT Pub. Date: Oct. 9, 2003

(65) Prior Publication Data

US 2005/0108156 A1    May 19, 2005

(30) Foreign Application Priority Data

Mar. 29, 2002  (JP)  .............................. 2002-097203

(51) Int. Cl.
*G06Q 40/00* (2006.01)
(52) U.S. Cl. ...................................................... 705/40
(58) Field of Classification Search ........................ None
See application file for complete search history.

(56) References Cited

U.S. PATENT DOCUMENTS

| | | | |
|---|---|---|---|
| 5,917,537 A * | 6/1999 | Lightfoot et al. ................ | 725/4 |
| 2002/0062467 A1* | 5/2002 | Hunzinger .................... | 714/749 |
| 2002/0116456 A1* | 8/2002 | Morita ......................... | 709/203 |
| 2003/0091031 A1* | 5/2003 | Kuhlmann et al. ............ | 370/352 |
| 2003/0142653 A1* | 7/2003 | Jiang et al. ................... | 370/338 |

FOREIGN PATENT DOCUMENTS

| | | |
|---|---|---|
| EP | 0 924 630 A1 | 6/1999 |
| JP | H9-093370 A | 4/1997 |
| JP | 2001-189724 A | 7/2001 |

(Continued)

OTHER PUBLICATIONS

PCT/IPEA/409 prepared for International Application No. PCT/JP2003/003609 filed Mar. 25, 2003 (3 pages).

(Continued)

*Primary Examiner*—Olabode Akintola
(74) *Attorney, Agent, or Firm*—Brinks Hofer Gilson & Lione

(57) ABSTRACT

A gateway server 40, in the case that discontinuation of TCP Connection A between a portable phone 10 and gateway server 40 is detected when gateway server 40 is relaying HTTP communication between portable phone 10 and a content server 70, maintains TCP Connection B1 between a billing management server 50 and gateway server 40 until gateway server 40 receives from billing management server 50 billing information for HTTP communication relayed up to the time of the discontinuation of TCP Connection A.

21 Claims, 10 Drawing Sheets

FOREIGN PATENT DOCUMENTS

| | | |
|---|---|---|
| JP | 2002-044732 A | 2/2002 |
| JP | 2003-101678 A | 4/2003 |
| WO | WO 01/58110 A2 | 8/2001 |
| WO | WO 01/58110 A3 | 8/2001 |

OTHER PUBLICATIONS

European Search Report, dated Dec. 30, 2009, pp. 1-5, European Patent Application No. 03712912.9-2416/1482680, European Patent Office, Germany.

* cited by examiner

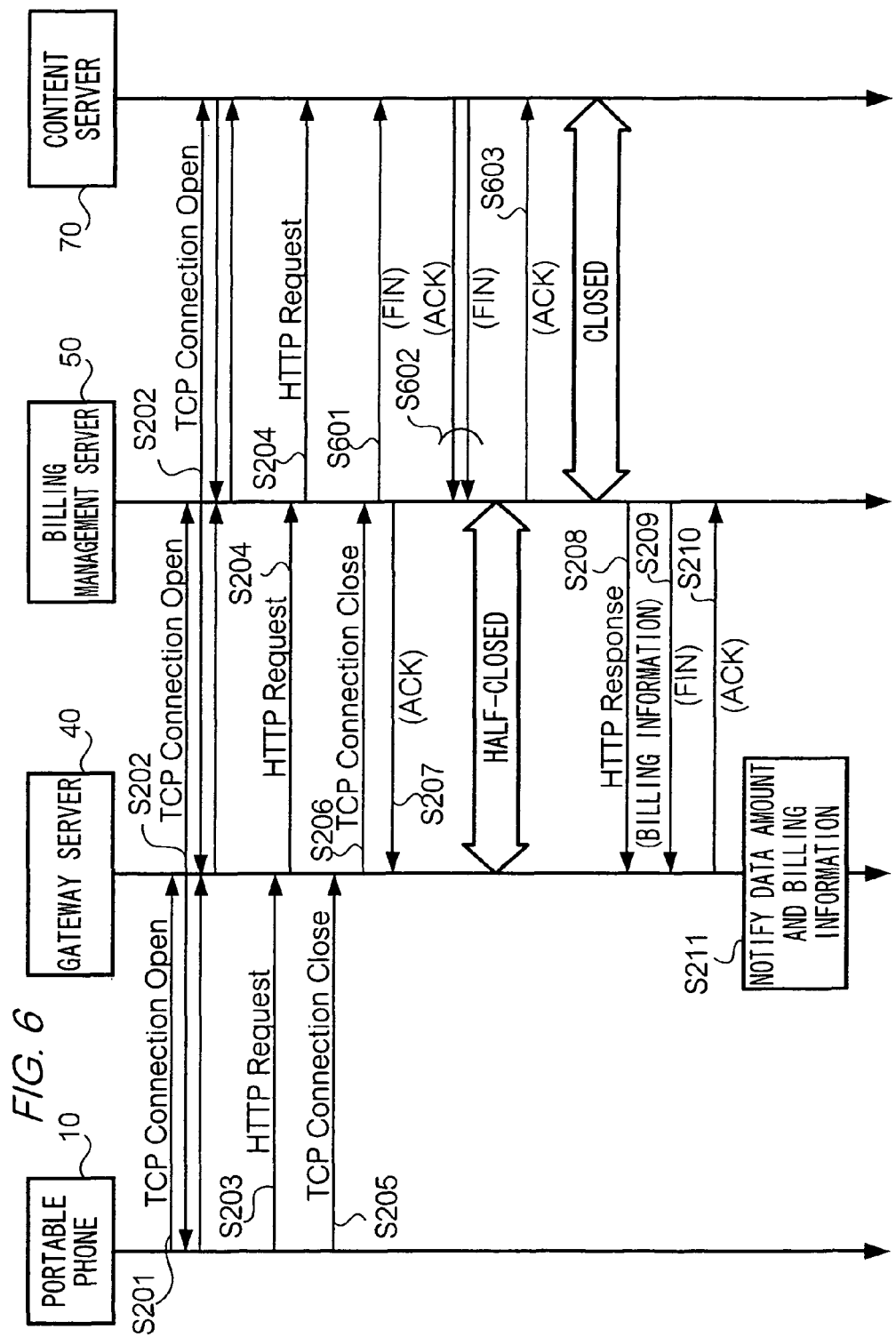

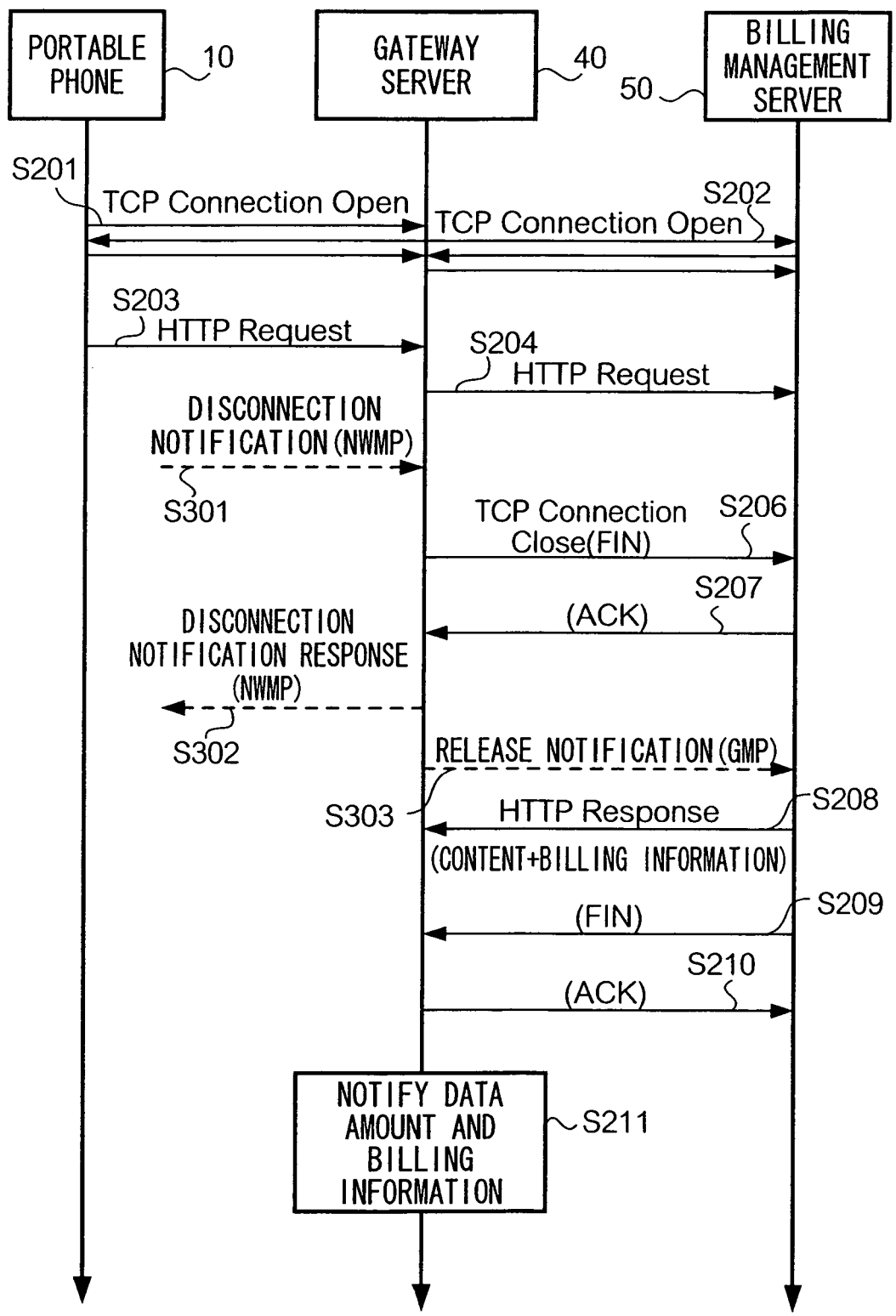

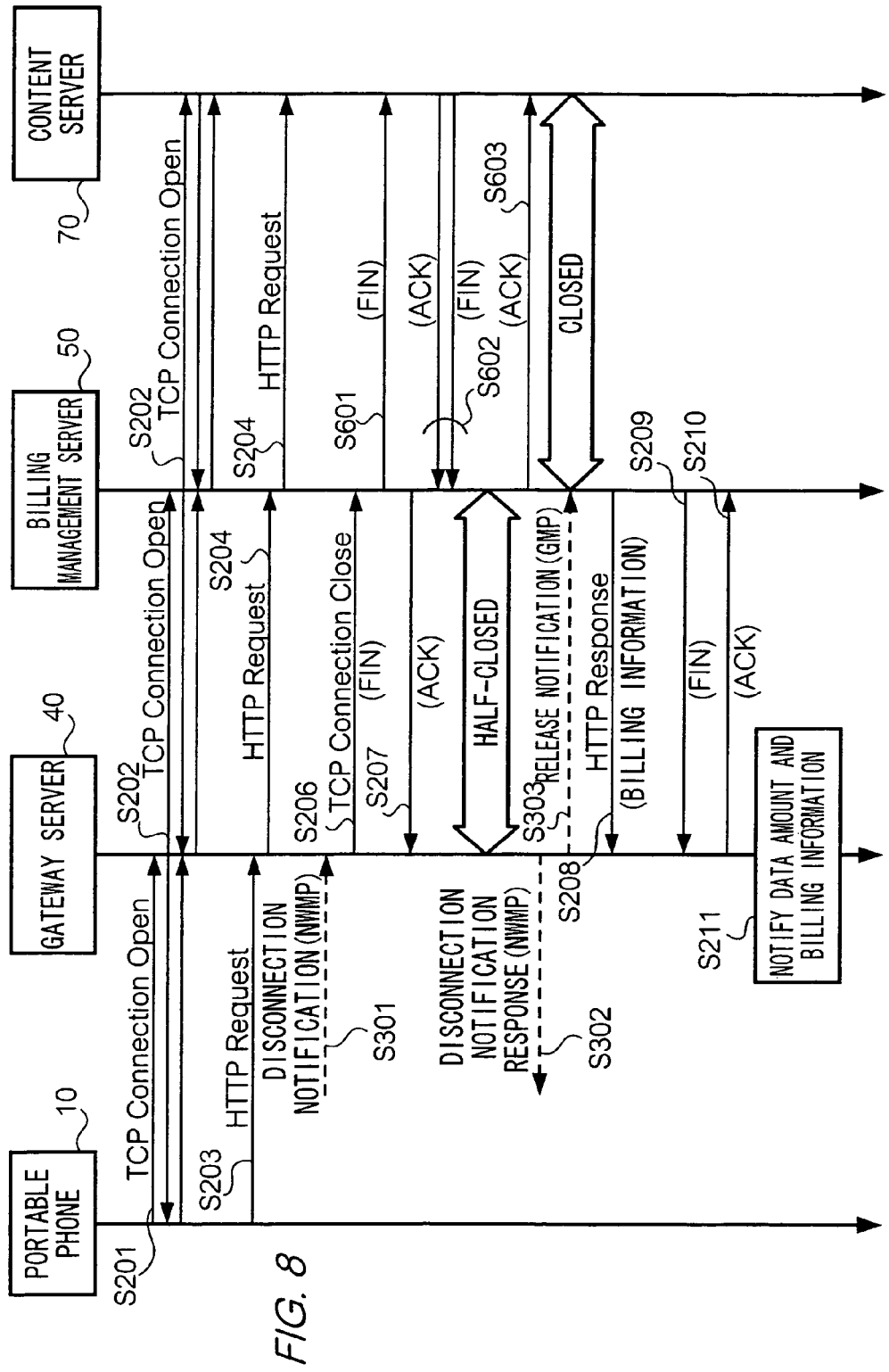

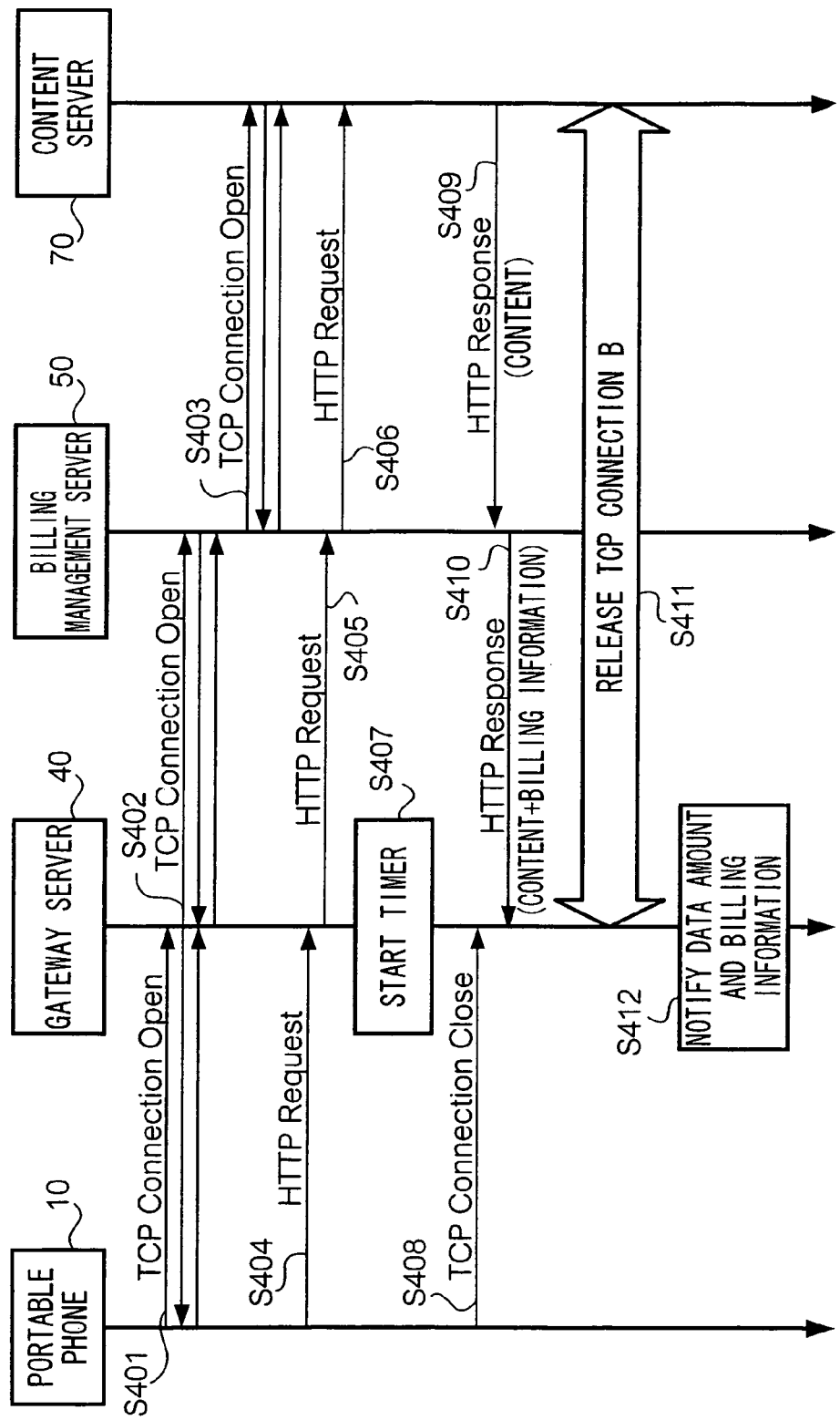

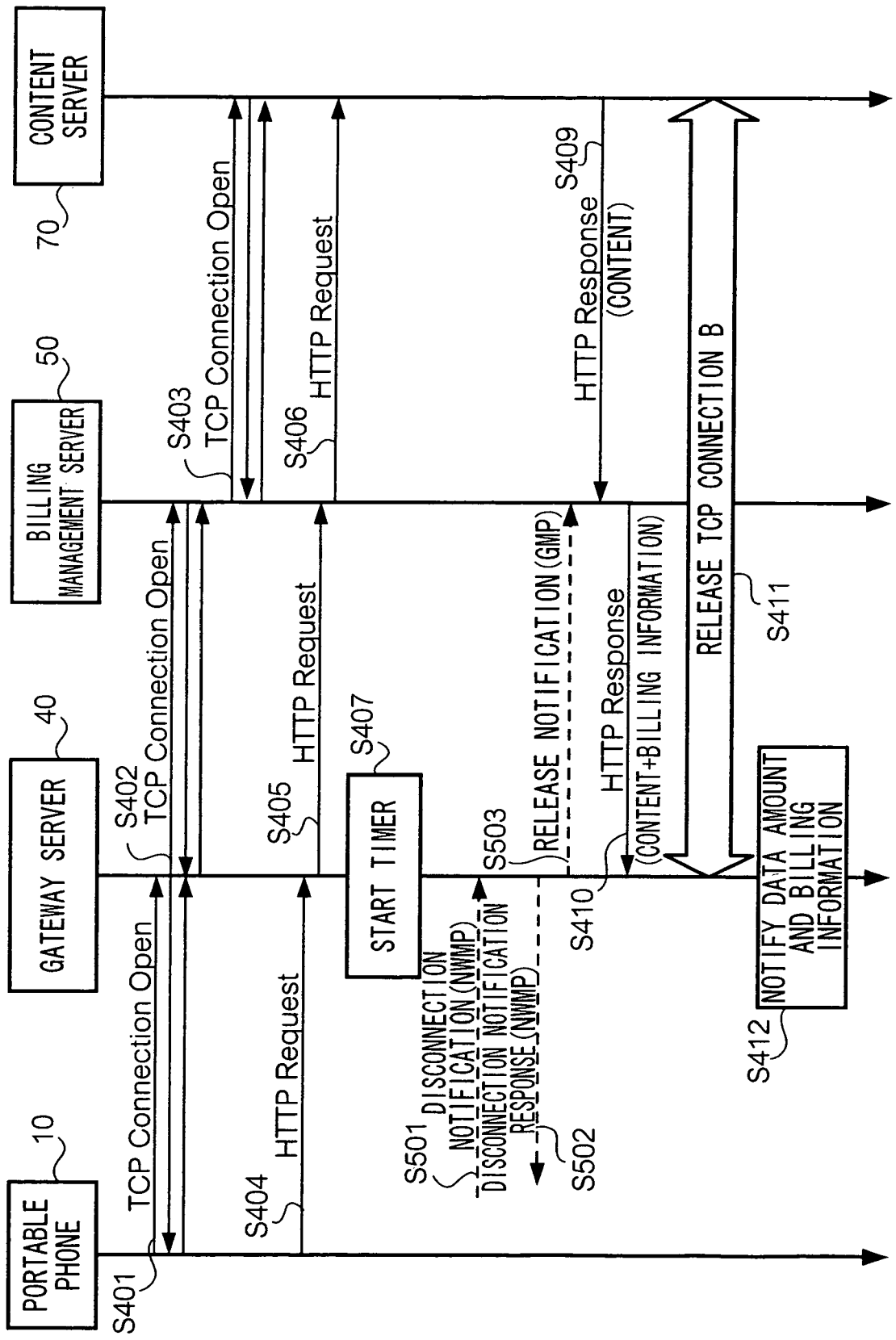

US 7,742,990 B2

COMMUNICATION CONTROL METHOD IN CONNECTION-ORIENTED COMMUNICATION, RELATED TRANSFER DEVICE, AND BILLING MANAGEMENT DEVICE

TECHNICAL FIELD

The present invention relates to techniques used for a billing process relating to connection-oriented communication.

BACKGROUND ART

In a connection-oriented communication method using a connection-type protocol typified by TCP (Transmission Control Protocol), end-to-end connection between a communication device and a correspondent communication device is first established, and then data is sequentially transmitted via the connection. The connection is released when the data transmission is completed. This type of communication method is characterized in that once a circuit (or a session) is established between communication devices; the same circuit is dedicated to the data transmission until the session is completed.

A communication carrier, which provides a packet communication service by way of connection-oriented communication, charges one of the parties on the basis of an amount of data transmitted and received during a connection period from when the connection is established until the connection is released. For example, in a case that a communication terminal requests a content server to deliver content to the terminal, a connection is first established between the communication terminal and the content server. The communication terminal transmits a content request message via the established connection to the content server, and, in response to the request message from the communication terminal, the content server delivers content to the communication terminal via the same connection. The connection is released after the communication terminal receives the content. The carrier operating the packet communication service performs a billing process, after obtaining information required for billing, on the basis of data transmitted or received via the connection, with the data including the request message sent from the communication terminal to the content server and the content delivered to the communication terminal.

In such connection-oriented communication, however, there exists a problem in that communication may be discontinued before data transmission is complete. This may occur as a result of an instruction issued by one of the communicating devices or as a result of a failure of a connection link. In the case that communication is discontinued following issuance of a request message, requested content can not be fully delivered from a content server to a requesting terminal; and consequently a carrier operating the packet communication service may not be able to obtain information required for billing, as a result of which it becomes impossible for a communication charge relative to the request message to be collected.

DISCLOSURE OF INVENTION

In view of the stated problems of the art described above it is an object of the present invention to provide a communication control method, a transfer device, a program, and a recording medium, use of which enable an appropriate communication charge to be made on the basis of an amount of data transmitted following issuance of request message, even in a case that connection-oriented communication is prematurely discontinued.

To achieve the stated object, the present invention provides a first communication control method comprising: relaying by a transfer device connection-oriented communication performed between a communication terminal and a correspondent communication device; and controlling a connection, at the transfer device, so as to maintain a connection at least between the transfer device and a billing management device, which device functions as a relay node of a connection between the transfer device and the communication device, in a case that the transfer device has not received billing information for the connection-oriented communication from the billing management device, when detecting, in the relaying step, discontinuation of a connection between the communication terminal and the transfer device.

Further, the present invention provides a second communication control method comprising: transmitting, from a transfer device relaying connection-oriented communication performed between a communication terminal and a correspondent communication device, to a billing management device, such a device functioning as a relay node of a connection between the transfer device and the communication device, a signal requesting disconnection of a connection used for transmitting data from the transfer device to the billing management device, in a case that the transfer device detects, when relaying the connection-oriented communication, discontinuation of a connection between the communication terminal and the transfer device; and transmitting, from the billing management device to the transfer device, billing information for the relayed connection-oriented communication in the case of receiving the disconnection request signal from the transfer device. Preferably, the billing management device determines billing information on the basis of a request message in a case that the billing management device, at the time of receiving the signal requesting disconnection of the connection, has not received a response message transmitted from the communication device in response to the request message transmitted from the communication terminal.

Preferably, in the above first and second communication control methods, billing information comprises information specifying a billing option to be applied to the connection-oriented communication from among a plurality of types of billing options for communication performed via the transfer device. Further, such billing information may be transmitted to the transfer device when the billing management device transmits to the transfer device a response message responsive to a request message transmitted from the communication terminal. In this case, the billing management device either inserts billing information in the header of the response message for transmission, or adds the billing information to the response message for transmission to the transfer device. Alternatively, the billing management device relates the billing information to the response message for transmission.

In one preferred embodiment of the above first and second communication control methods, the transfer device detects discontinuation of a connection between the communication terminal and the transfer device upon receiving, from a relay node located in a path of the link, a signal indicating disconnection of a link established between the communication terminal and the transfer device, the link being used in the connection-oriented communication. Alternatively, the transfer device detects discontinuation of a connection between the communication terminal and the transfer device upon receiving from the communication terminal a request for disconnecting a connection with the communication device.

In another preferred embodiment of the first and second communication control methods, the transfer device measures an amount of data transmitted to and received from the communication terminal, and transmits to an accounting management device for computing communication charges, the measured data amount and the billing information received from the billing management device. Preferably, in the measuring step, the transfer device measures, an amount of data transmitted to and received from the communication terminal, with the exception of transmitted and received data control signals used for controlling a connection with the communication terminal. Further, the accounting management device may bill for communication on the basis of both an amount of data transmitted and billing information transmitted in the transmission step.

The present invention further provides a first transfer device comprising relaying means for relaying connection-oriented communication between a communication terminal and a correspondent communication device; and connection control means for controlling a connection when the connection-oriented communication is being relayed by the relaying means, so as to maintain a connection at least between the transfer device and a billing management device, which device functions as a relay node for a connection between the transfer device and the communication device, in a case that the transfer device, upon detecting discontinuation of a connection between the communication terminal and the transfer device, has not received billing information for the relayed connection-oriented communication from the billing management device.

Further, the present invention provides a second transfer device comprising relaying means for relaying connection-oriented communication between a communication terminal and a correspondent communication device; time keeping means for counting time from when the transfer device transmits to the communication device a request message received from the communication terminal, until the transfer device receives a response message transmitted from the communication device responsive to the request message; and connection control means for controlling a connection, when connection-oriented communication is relayed by the relaying means, so as to maintain a connection between the transfer device and the communication device until the transfer device receives billing information for the relayed connection-oriented communication from a billing management device, which device functions as a connection relay node between the transfer device and the communication device, or until a time counted by the time keeping means exceeds a prescribed time, the connection being maintained in a case that the counted time does not exceed the prescribed time, and the transfer device has not received the billing information.

The billing information may be transmitted to the above first or second transfer device when the billing management device transmits to the transfer device a response message responsive to a request message transmitted from the communication terminal. Preferably, the billing information comprises information specifying a billing option to be applied to connection-oriented communication, from among a plurality of types of billing options applicable to communication performed via the transfer device.

In another preferred embodiment, the first and second transfer devices detect discontinuation of connection between the communication terminal and the transfer device upon receiving a signal indicating disconnection of a link established between the communication terminal and the transfer device from a relay node located in a path of the link; the link being used for the connection-oriented communication. Alternatively, the transfer device detects discontinuation of connection between the communication terminal and the transfer device upon receiving from the communication terminal a request for disconnecting a connection with the communication device.

In another preferred embodiment, the first and second transfer devices further comprise measuring means for measuring an amount of data transmitted to and received from the communication terminal; and transmission means for transmitting to an accounting management device for computing communication charges for the communication terminal, an amount of data measured by the measuring means and billing information received from the billing management device. Preferably, the measuring means measures an amount of data transmitted to and received from the communication terminal by the relaying means, except for transmitted and received control signal data used for controlling the connection with the communication terminal.

Preferably, the first and second transfer devices are gateway servers.

In addition, the present invention further provides a billing management device comprising: storage means for storing billing management information for connection-oriented communication performed between a communication terminal and a correspondent communication device; determination means for determining billing information on the basis of billing management information stored in the storage means in the case of receiving, from a transfer device relaying the connection-oriented communication, a signal requesting for disconnection of a connection for transmitting data to the billing management device, while connection-oriented communication is being performed; and transmission means for transmitting to the transfer device billing information determined by the determination means.

In another preferred embodiment, the determination means determines billing information on the basis of a request message in a case that the billing management device, at the time of receiving the signal from the transfer device, has not received a response message from the communication device in response to a request message transmitted from the communication terminal.

In another preferred embodiment, the transmission means transmits billing information when the billing management device transmits a response message in response to a request message transmitted from the communication terminal. The transmission means either inserts the billing information in the header of the response message or adds the billing information to the response message for transmission. Alternatively, the transmission means relates the billing information to the response message for transmission.

Preferably, the billing information is information specifying a billing option to be applied to the connection-oriented communication from among a plurality of types of billing options applicable to communication performed via the transfer device.

The present invention further provides a program for causing a transfer device to execute the process of the first communication control method, and a computer-readable recording medium storing the program. Similarly, the present invention provides a program for causing a billing management device to execute the process of the second communication control method, and a computer-readable recording medium storing the program.

Thus, the techniques provided by the present invention enable the proper billing for connection-oriented communication according to the amount of transmitted data.

BRIEF DESCRIPTION OF DRAWINGS

FIG. 6 relates to the embodiment, and is a sequence chart illustrating a detailed operation of each unit of the communication system in the same case as that shown in FIG. 5.

FIG. 7 relates to the embodiment, and is a sequence chart illustrating an operation of each unit of the communication system in a case where a packet link in a mobile packet communication network is disconnected during the HTTP communication.

FIG. 8 relates to the embodiment, and is a sequence chart illustrating a detailed operation of each unit of the communication system in the same case as that shown in FIG. 7.

FIG. 9 relates to a first modification of the present invention, and is a sequence chart illustrating an operation of each unit of the communication system.

FIG. 10 relates to the first modification of the present invention, and is another sequence chart illustrating an operation of each unit of the communication system.

PREFERRED EMBODIMENTS

Figure 1:
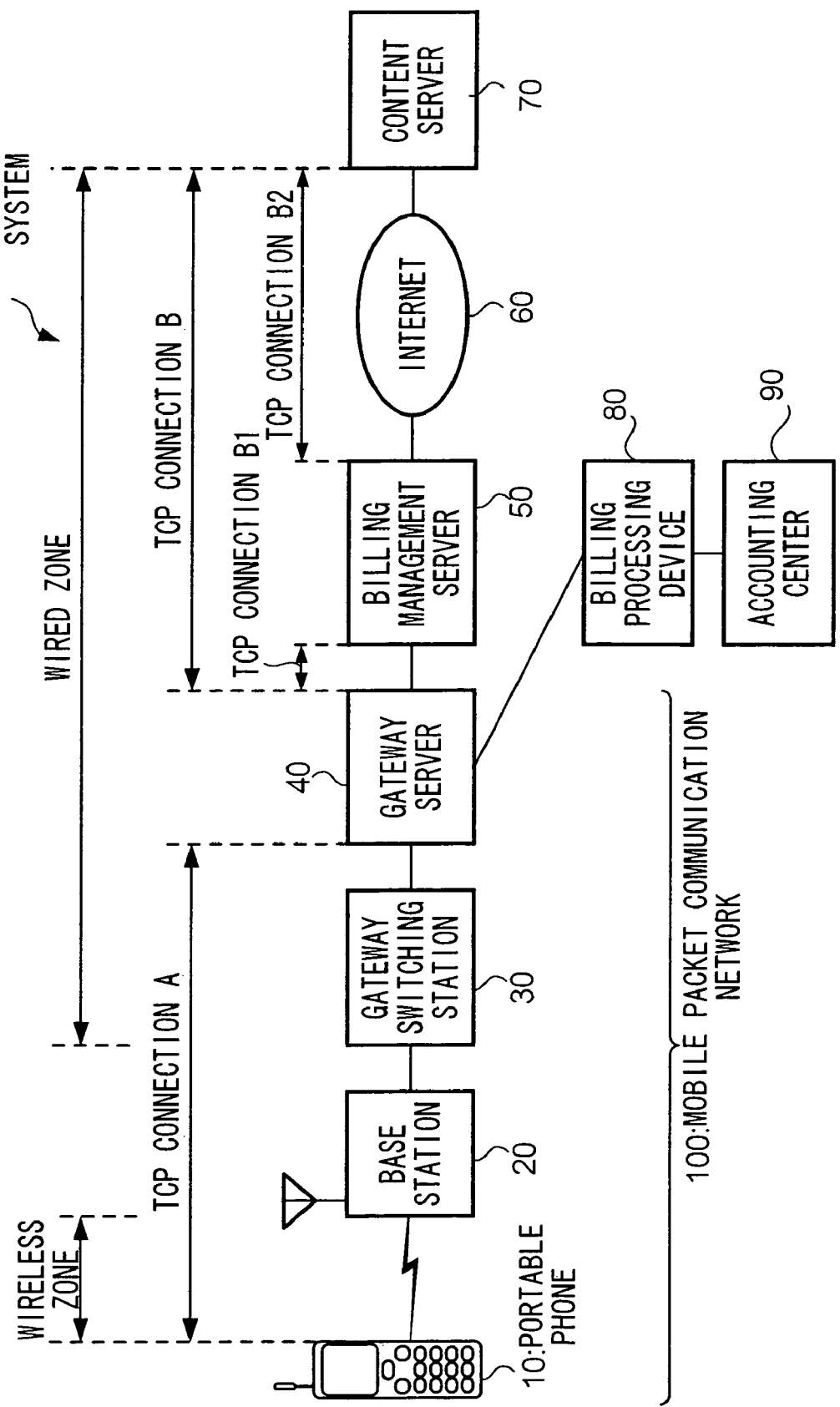
FIG. 1 is a block diagram showing a configuration of a communication system according to an embodiment of the present invention.

In the following, a preferred embodiment of the present invention will be described with reference to the attached drawings. It is to be noted that the same reference numerals are used for elements common among the drawings.

A-1. Configuration of Embodiment

1. Configuration of communication system

FIG. 1 is a block diagram illustrating a configuration of a communication system 1 according to an embodiment of the present invention. As shown in the figure, communication system 1 comprises a mobile packet communication network 100 having a portable phone 10, a base station 20, a gateway switching station 30, and a gateway server 40, as well as a billing management server 50, the Internet 60, and a content server 70, a billing processing device 80, and an accounting center 90.

Mobile packet communication network 100 is a communication network providing a packet communication service to portable phones 10 served by the same mobile packet communication network 100, and network 100 conforms with IMT-2000 (International Mobile Telecommunication 2000). It is to be noted that communication system 1 further comprises a mobile telephone network (not shown) in addition to mobile packet communication network 100. The mobile telephone network provides, to portable phone(s) 10, a voice communication service for general mobile telephones.

Portable phone 10 is a mobile station which performs wireless communication, from within a number of base stations 20 disposed in a communication service area of mobile packet communication network 100, with a base station 20 covering a wireless cell where the phone is located, thereby receiving a packet communication service and a voice communication service. In portable phone 10 a web browser is installed, and the phone can therefore perform HTTP (HyperText Transfer Protocol) communication with content server 70.

Gateway server 40 is a proxy-type gateway server provided between gateway switching station 30 of mobile packet communication network 100 and billing management server 50. Gateway server 40 has a function of relaying data exchanges by converting data between different protocols, for example, between a communication protocol for mobile packet communication network 100 and a communication protocol for Internet 60. Also, gateway server 40 has a function of capturing packets exchanged with portable phone 10 and measuring the amount of data on the basis of the size of each packet and the number of the packets.

Gateway server 40 establishes a TCP Connection A with portable phone 10 as well as a TCP Connection B with content server 70 in a case that HTTP communication is performed between portable phone 10 and content server 70, thereby relaying the above HTTP communication. As shown in FIG. 1, TCP Connection B has a TCP Connection B1 between gateway server 40 and billing management server 50 and a TCP Connection B2 between billing management server 50 and content server 70. In the description, no distinction is made between TCP Connection B1 and TCP Connection B2, and they are referred to as a single connection, TCP Connection B, unless otherwise required.

Billing management server 50 stores various information on the customers of the communication carrier operating mobile packet communication network 100, such information including a terminal ID for identifying each portable phone 10 subscribing a packet communication service and a provider ID for identifying each content provider providing content to portable phone 10 using content server 70.

Billing management server 50 monitors HTTP communication performed between portable phone 10 and content server 70, and determines on the basis of stored information (billing management information) which billing option is to be applied to the concerned HTTP communication. Upon receiving a HTTP Response message (hereinafter referred to as HTTP Response) returned from content server 70 as a response to a HTTP Request message (hereinafter referred to as HTTP Request) transmitted from portable phone 10, billing management server 50 inserts, in the header of HTTP Response, billing information showing the above billing option and the like information and transmits the HTTP Response to gateway server 40.

The billing options can include three types of billing options being a user billing in which a user of portable phone 10 is charged for the packet communication, a content provider (CP) billing in which a content provider is charged for the communication, and no billing in which neither the user nor the content provider is charged for the communication. In the case of the CP billing, billing management server 50 inserts, in the extension header of HTTP Response, a provider ID specifying a particular content provider as the billed party in addition to the billing information specifying a billing option.

Content server 70 has a function of performing HTTP communication with portable phone 10, and stores various types of content including image data, music data, application programs and the like to be provided to portable phone 10. The stored content is transmitted to portable phone 10, using the above function of performing HTTP communication.

Billing processing device 80 performs a billing process on the basis of billing data (the data amount and billing information) received from gateway server 40, and transfers the result of the process to accounting center 90. Accounting center 90 issues a bill to each content provider and each portable phone 10 subscribing a packet communication service and a voice communication service after computing monthly communication charges for the packet communication and voice communication to collect communication charges from the subscriber of portable phone 10 or from a content provider.

<2. Configuration of Communication Protocol>

Mobile packet communication network 100 and billing management server 50 support a signal control protocol for call control and a user data protocol for transmitting user data; both protocols being related to a packet communication performed by portable phone 10. In the following description, the signal control protocol for call control will be referred to as a C-Plane (Control-Plane) protocol, and the user data protocol for transmitting user data as a U-Plane (User-Plane) protocol.

Figure 2:
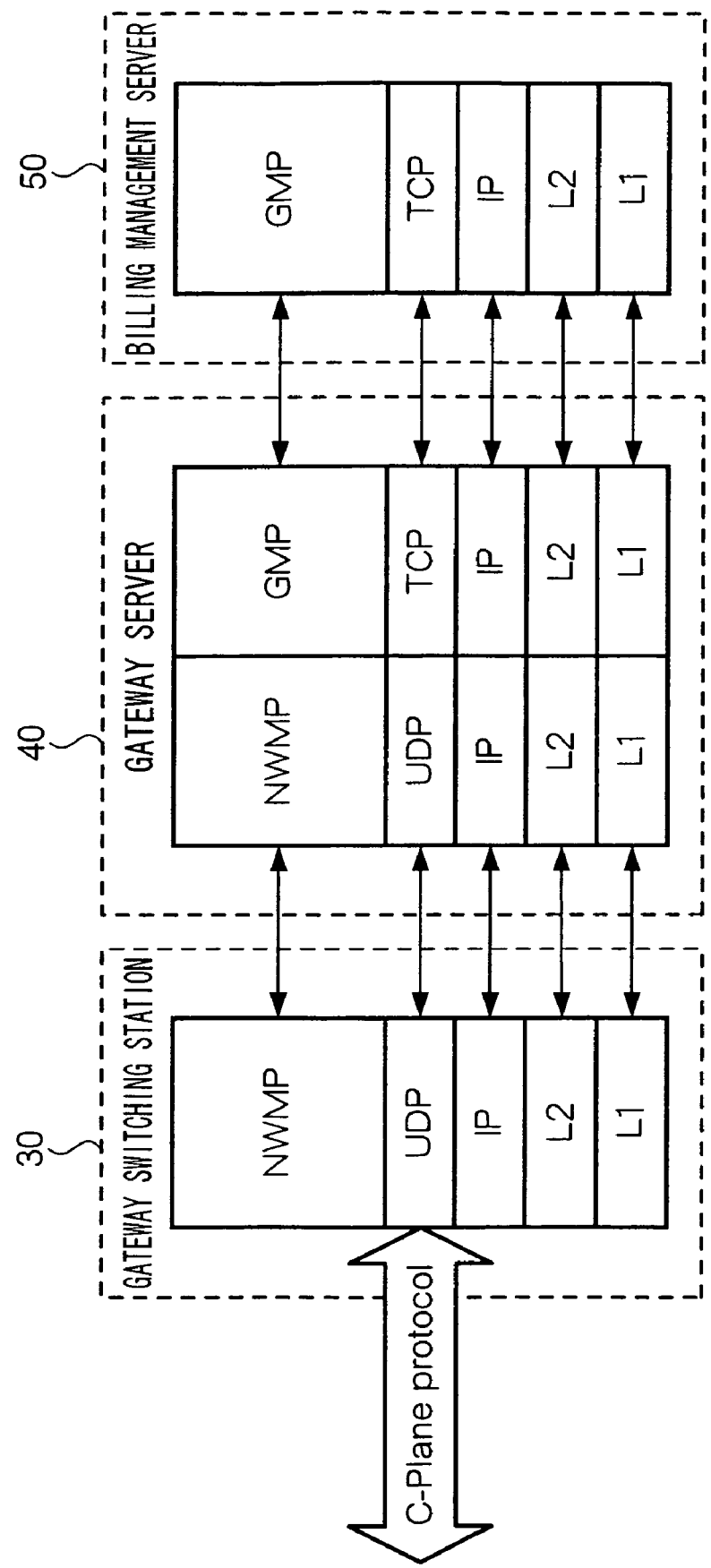
FIG. 2 is a diagram illustrating a C-Plane protocol configuration according to the embodiment.

FIG. 2 is a diagram showing a configuration of C-Plane protocols. C-Plane protocols are communication protocols for transmitting/receiving a control signal for a call connection/maintenance, a call release, a call termination, and the like. It is to be noted that a hierarchical structure of protocols shown in the figure corresponds to the OSI (Open Systems Interconnection) reference model; in the example of gateway switching station 30 shown in the figure, NWMP (NetWork Management Protocol) is a protocol corresponding to Application layer, Presentation layer, and Session layer; UDP (User Datagram Protocol) corresponding to Transport layer; IP corresponding to Network layer; L2 corresponding to Datalink layer; and L1 corresponding to Physical layer.

As shown in the figure, C-Plane protocol used in mobile packet communication network 100 is not the same as C-Plane protocol used between gateway server 40 and billing management server 50, being NWMP and GMP (Grimm Management Protocol), respectively. For this reason, gateway server 40 converts control messages notified from gateway switching station 30 according to NWMP to messages in accordance with GMP, where necessary, and transmits the messages to billing management server 50.

A control signal for connecting/releasing a packet link and for notifying a disconnection, as well as a control signal for establishing TCP Connection A and TCP Connection B1 is transmitted/received using a C-Plane protocol, NWMP, between communication nodes such as base station 20, gateway switching station 30, and gateway server 40 within mobile packet communication network 100, and billing management server 50.

There may be a case where a wireless link between portable phone 10 and base station 20 is disconnected while HTTP communication is being performed between portable phone 10 and content server 70. Such disconnection may occur because portable phone 10 moves outside the communication range, or its battery becomes exhausted. Also, there may be a case where the wireless link or a wired link from base station 20 to gateway server 40 is disconnected due to congestion in or of a failure in mobile packet communication network 100. In such cases, when relay nodes for a packet link such as base station 20, gateway switching station 30, a subscriber switch station (not shown), and like stations detect disconnection of the packet link, the detecting node transmits to gateway server 40 a control signal notifying disconnection of the packet link using NWMP.

Figure 3:
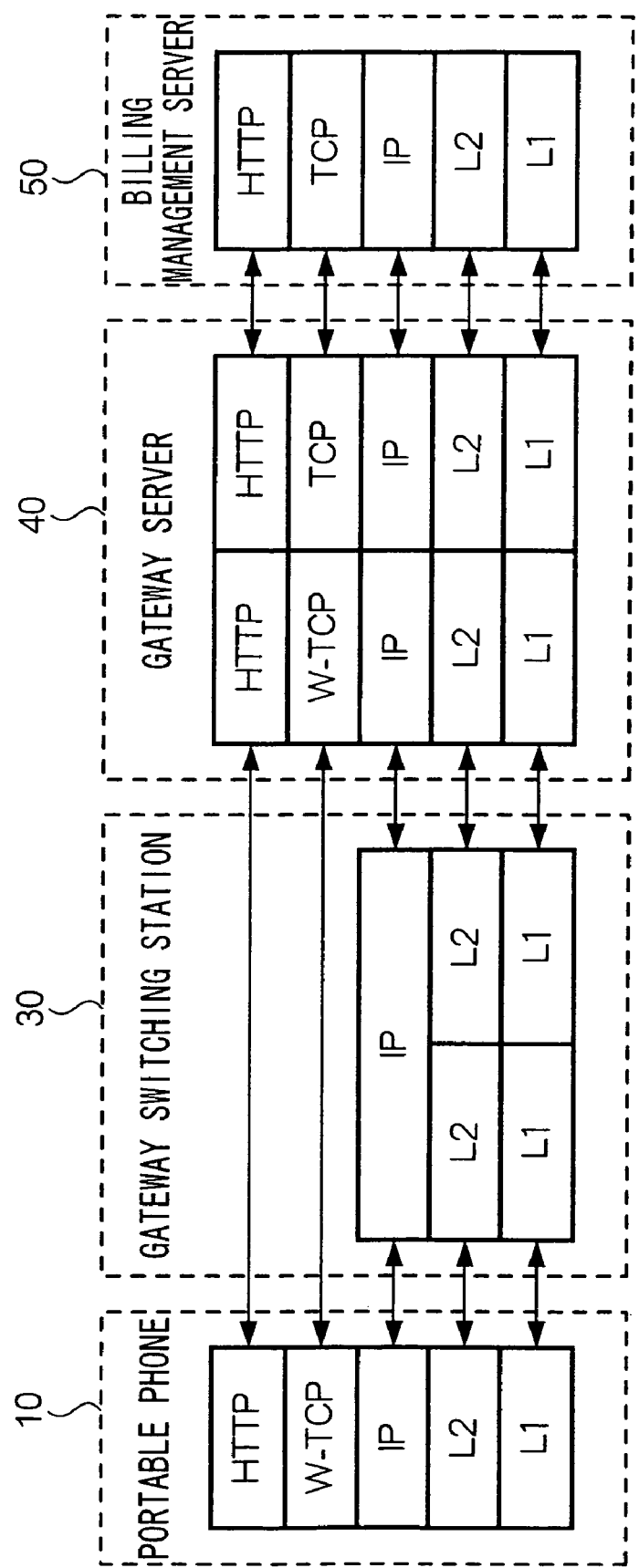
FIG. 3 is a diagram illustrating a U-Plane protocol configuration according to the embodiment.

FIG. 3 is a diagram illustrating a configuration of U-Plane protocols. U-Plane protocol is a communication protocol for performing HTTP communication, by which HTTP Requests or Responses are transmitted or received using U-Plane protocols, thereby enabling portable phone 10 to view HTML (HyperText Markup Language) content made open to the public by content server 70. U-Plane protocols are also used for transmitting and receiving electronic mail. In FIG. 2, a hierarchical structure of protocols corresponds to the OSI reference model.

As shown in FIG. 2, HTTP is used between portable phone 10 and billing management server 50 as a U-Plane protocol for controlling web access and transmitting and receiving electronic mail. In this figure gateway server 40 operates as a HTTP proxy.

A Transport Layer protocol (W-TCP: TCP Profile over W-CDMA) is used in mobile packet communication network 100, W-TCP being configured based on TCP by tuning parameters packaged in TCP, in consideration of transmission delay time in mobile packet communication network 100 having wireless zones. In this way effective utilization of transmission bandwidth is realized. On the other hand, a standard TCP is used between gateway server 40 and billing management server 50; in which case gateway server 40 converts data between W-TCP and TCP in relaying HTTP communication.

It is to be noted that gateway server 40 measures, from among packets transmitted to and received from portable phone 10, a size and a number of packets transmitted and received using the U-Plane protocol as packets for which a charge is incurred.

Described in the foregoing is one configuration of communication system 1 according to the present embodiment.

[A-2. Operation of Embodiment]

Next, description will be given of an operation of the present embodiment.

1. Normal Operation in HTTP Communication

Figure 4:
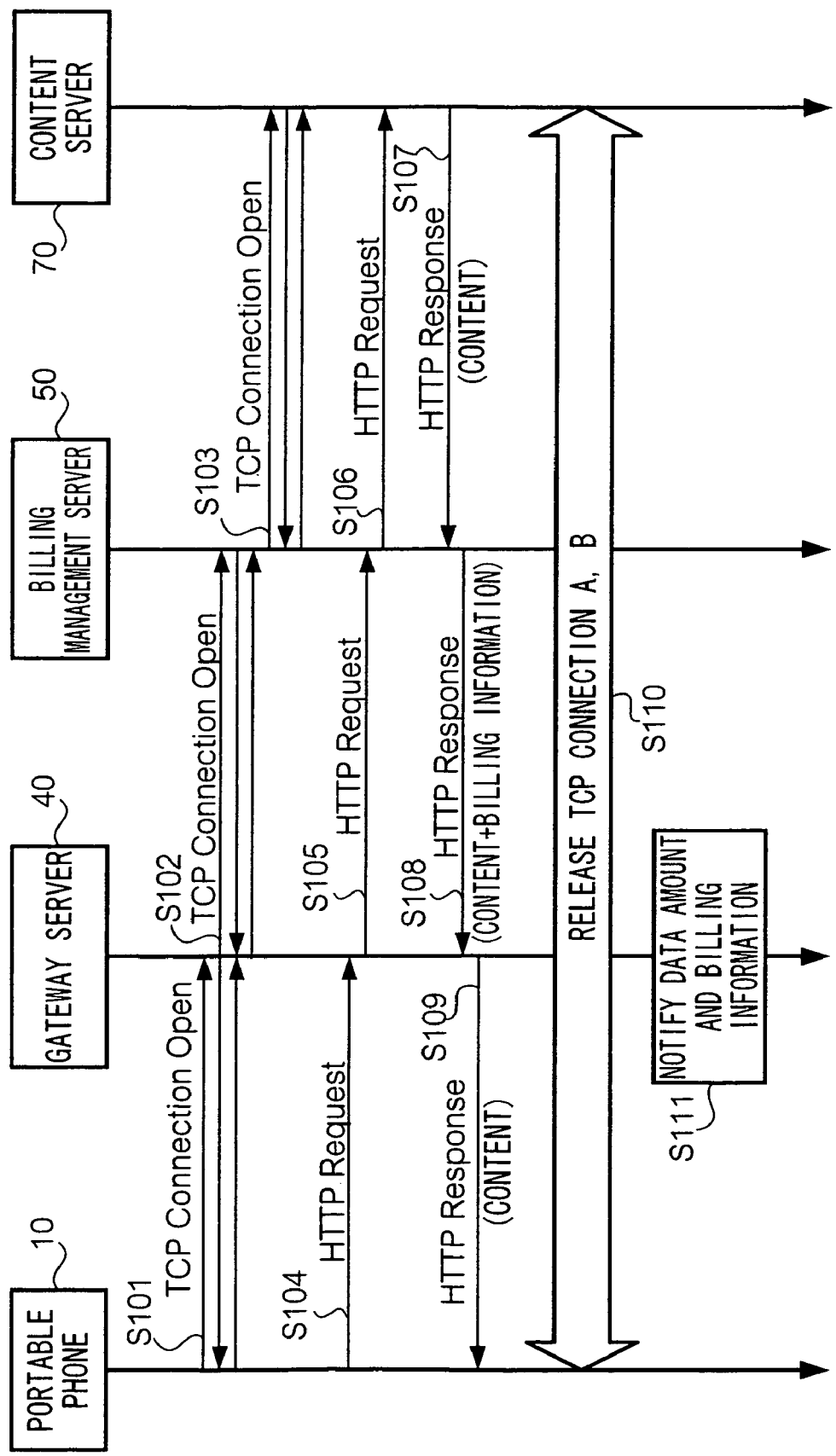
FIG. 4 relates to the embodiment, and is a sequence chart illustrating a basic operation of each unit of the communication system in a case where HTTP communication is performed between a portable phone and a content server.

First, description will be given, with reference to FIG. 4, of a basic operation of each unit in communication system 1 in a case of HTTP communication being performed between portable phone 10 and content server 70. It is to be noted that in the sequence chart shown in the figure, there are shown only signals transmitted and received using a U-Plane protocol.

When a user of Portable phone 10 starts a web browser, the phone transmits a TCP Connection Open message (hereinafter referred to as TCP Connection Open) (step S101). Signals required for opening TCP Connections A and B are transmitted and received among portable phone 10, gateway server 40, content server 70, and relay nodes (including billing management server 50) relaying respective TCP Connections A and B (step S102, S103). Thus, TCP Connection A is established between portable phone 10 and gateway server 40; and TCP Connection B is established between gateway server 40 and content server 70.

In practice, before transmitting TCP Connection Open, control signals relating to a packet link connection is transmitted/received, according to a C-Plane protocol (NWMP), among communication nodes disposed between portable phone 10 and gateway server 40 in mobile packet communication network 100, thereby enabling a packet link to be established between portable phone 10 and gateway server 40. Subsequently, via the established packet link, a TCP control signal such as TCP Connection Open is exchanged between portable phone 10 and gateway server 40, thereby establishing TCP Connection A.

Similarly, gateway server 40 and billing management server 50 transmit and receive control signals of a packet link according to a C-Plane protocol (GMP), subsequent to which a TCP control signal is transmitted/received via the packet link, thereby establishing TCP Connection B1. A packet link is first established also between billing management server 50 and content server 70, after which a TCP control signal is transmitted/received via the packet link, thereby establishing TCP Connection B2.

Subsequently, once portable phone 10 has accessed a home page provided by content server 70, a user of portable phone 10 a performs an operation input for a menu selection, downloading of content, or the like, as a result of which a HTTP Request including instruction details based on the operation input is transmitted from portable phone 10 to gateway server 40 via TCP Connection A (step S104). Further, the HTTP Request is transmitted from gateway server 40 to billing management server 50, and further to content server 70 via TCP Connection B (step S105, 106).

Content server 70, upon receiving the HTTP Request from portable phone 10, reads, from its memory, content corresponding to the details of the instruction included in the HTTP Request (for example, screen data for a specified menu, specified content, and the like) and transmits it to portable phone 10 as HTTP Response (step S107).

Billing management server 50, upon receiving the HTTP Response from content server 70, first determines which billing option is to be applied to the HTTP communication on the basis of stored information (billing management information). Billing management server 50 then inserts in the extension header of the received HTTP Response, billing information specifying a determined billing option and the like. It is to be noted that billing options include three types: user billing, CP billing, or no billing. In the case of CP billing, a provider ID specifying the billed party is inserted in the extension header along with information specifying the billing option. Then, billing management server 50 transmits to gateway server 40 the HTTP Response, with the billing information inserted in the extension header (step S108).

Gateway server 40, upon receiving the HTTP Response from billing management server 50 first writes in its memory the billing information inserted in the extension header. Next, gateway server 40 deletes the billing information from the extension header of HTTP Response, and then transmits the same HTTP Response to portable phone 10 (step S109). The HTTP Response is transmitted to portable phone 10 via TCP Connection A.

In this way, portable phone 10 is able to download desired content from content server 70 by way of HTTP communication. Subsequently, an instruction is input into portable phone 10 to end HTTP communication, as a result of which portable phone 10 transmits a TCP Connection Close message (hereinafter referred to as TCP Connection Close) to gateway server 40. Portable phone 10, gateway server 40, billing management server 50, and content server 70 then perform a process for releasing TCP Connection A and/or TCP Connection B (step S110), to thereby end HTTP communication.

In the meantime, gateway server 40 quantifies an amount of packet data transmitted and received using a U-Plane protocol between gateway server 40 and portable phone 10 from a time when TCP Connection Open was transmitted from portable phone 10 in the above step S101 up to the time that TCP Connection A, B was released in the above step S110. Then, gateway server 40 transmits to billing processing device 80 the data amount and the billing information that have been stored in the memory (step S111).

Billing processing device 80 then performs a billing process on the basis of the data amount and the billing information received from gateway server 40, and transmits the result of the process to accounting center 90. Accounting center 90 computes monthly communication charges for packet communication and voice communication on the basis of data received from billing processing device 80 and other devices to issue a bill, so as to collect communication charges from a subscriber of portable phone 10 or from a content provider.

2. Operation Performed when TCP Connection A is Released during HTTP Communication Next, description will be given, with reference to FIGS. 5 to 8, of an operation of each unit of communication system 1 in the case of TCP Connection A between portable phone 10 and gateway server 40 being released when HTTP communication is being performed between portable phone 10 and content server 70.

Instances of release of TCP Connection A during HTTP communication can broadly be divided into the following two categories:

(1) A user of portable phone 10 inputs an instruction to terminate HTTP communication during HTTP communication. For example, the user, having requested content from content server 70, either accidentally or purposefully instructs discontinuation of content download.

(2) A wireless link between portable phone 10 and base station 20 is disconnected during HTTP communication due to portable phone 10 moving outside a communication range, or due to its battery becoming exhausted; or the wireless link or a wired link between base station 20 and gateway server 40 is disconnected during HTTP communication as a result of congestion or of a failure occurring in mobile packet communication network 100.

In either of the above cases (1) and (2), it is assumed that HTTP communication is discontinued before a HTTP Response including content is delivered to portable phone 10.

Now, description will be given, with reference to FIG. 5 and FIG. 6, of an operation performed by portable phone 10, gateway server 40, and billing management server 50 in the above case (1). In the sequence charts appearing in the figures, there are shown only signals transmitted and received using a U-Plane protocol, as is the case in FIG. 4. Also, description of those portions corresponding to those already described in relation to FIG. 4 will be simplified. Further, in FIG. 6, the same step numbers have been assigned to the same steps as appear in FIG. 5, and description thereof will be omitted.

Figure 5:
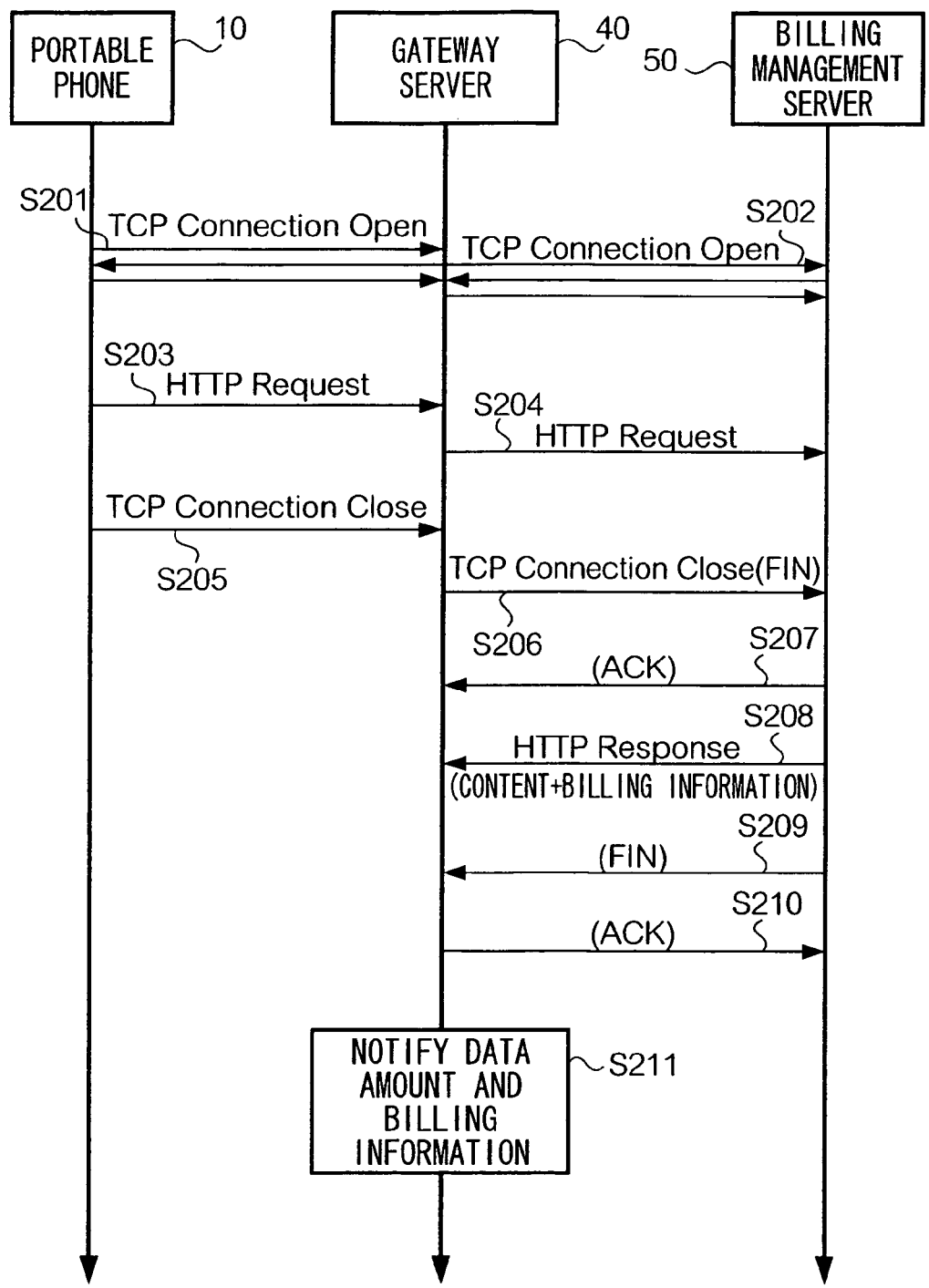
FIG. 5 relates to the embodiment, and is a sequence chart illustrating an operation of each unit of the communication system in a case where a user of the portable phone instructs a termination of a connection during the HTTP communication.

In FIG. 5, when a TCP Connection Open is transmitted from portable phone 10 (step S201), signals required for opening a TCP Connection are transmitted/received between portable phone 10, gateway server 40, content server 70 (not shown in the figure), and other relay nodes for TCP Connection A, B (step S202), thereby establishing TCP Connection A between portable phone 10 and gateway server 40 and TCP Connection B between gateway server 40 and content server 70. As a result, HTTP communication is established between portable phone 10 and content server 70.

Next, when a HTTP Request is transmitted from portable phone 10, the HTTP Request is transmitted to gateway server 40 via TCP Connection A (step S203). The HTTP Request is further transmitted from gateway server 40 to billing management server 50 via TCP Connection B, and still further to content server 70 (step S204).

After the HTTP Request is thus transmitted, when a user of portable phone 10 wishes to terminate the HTTP communication, portable phone 10 is caused to transmit TCP Connection Close to gateway server 40 following the user's instruction (step S205). After receiving the TCP Connection Close, gateway server 40 releases TCP Connection A with portable phone 10.

Subsequently, to obtain billing information from billing management server 50, gateway server 40 half-closes TCP Connection B so as to maintain TCP Connection B until server 40 receives a HTTP Response.

In other words, gateway server 40 first transmits, to billing management server 50, a FIN (Finish) signal requesting TCP Connection Close via TCP Connection B1 (step S206). Upon receiving the FIN signal for TCP Connection Close, billing management server 50, transmits to gateway server 40 ACK via TCP Connection B1 (step S207).

Subsequently, billing management server 50 releases TCP Connection B2 from content server 70, and then determines which billing option is to be applied to the HTTP Request transmitted from portable phone 10 in the above step S203. Such determination is made on the basis of stored information in the server (billing management information). Next, billing management server 50 generates a HTTP Response, and inserts in the extension header of the HTTP Response billing information specifying a determined billing option and the like, for transmission to gateway server 40 (step S208).

Gateway server 40, upon receiving the HTTP Response, stores in its memory billing information inserted in the extension header of the Response. Gateway server 40 abandons data of the HTTP Response after storing the billing information in the memory since TCP Connection A has already been released.

Also, billing management server 50, after transmitting the HTTP Response, transmits, to gateway server 40, FIN for terminating a half-closed TCP Connection B (step S209). Gateway server 40, when it receives FIN from billing management server 50, returns ACK to billing management server 50 (step S210), thereby terminating HTTP communication. By performing the above steps S209 and S210, TCP Connection B (TCP Connection BI because TCP Connection B2 has already been released after the above step S207) is released.

In the meantime, gateway server 40 measures an amount of packet data transmitted to and from portable phone 10 using a U-Plane protocol from a time that TCP Connection Open was transmitted from portable phone 10 in the above step S201 to the time that TCP Connection A was released. Gateway server 40 transmits the measured data amount and the billing information in the memory to billing processing device 80 (step S211). Billing processing device 80 performs, on the basis of the data amount and the billing information received from gateway server 40, a billing process for communication charges up to the time that HTTP communication was disconnected; and on the basis of the result of the process, accounting center 90 computes, for each portable phone 10 and content provider, communication charges for packet communication so as to issue a bill.

FIG. 6 is a sequence chart illustrating the process described in FIG. 5 in detail. In FIG. 6, the description of the same steps as those shown in FIG. 5 are omitted and detailed description will be given for the process from steps S205 to S210.

In the above step S205, it is assumed that gateway server 40 receives TCP Connection Close from portable phone 10 either (a) after receiving, from billing management server 50, a HTTP Response originating from content server 70, or (b) before receiving the response. In the case (a), gateway server 40 abandons data of HTTP Response after storing the billing information inserted in the extension header of the Request because TCP Connection A with portable phone 10 has already been released. Subsequently, TCP Connection B is released.

In the case (b), gateway server 40 has not obtained billing information because it has not received a HTTP Response from billing management server 50. Consequently, gateway server 40 maintains TCP Connection B until it receives a HTTP Response from billing management server 50, so as to obtain billing information. Under these circumstances, TCP Connection B1 is maintained in a half-closed state, and gateway server 40 is able to receive a HTTP Response as long as a connection of the communication for transmitting data in the direction from billing management server 50 to gateway server 40 is maintained. In other words, TCP Connection B1 is maintained in a half-closed state in a case that gateway server 40, after transmitting to billing management server 50 a HTTP Request originating from portable phone 10, receives TCP Connection Close from portable phone 10 without receiving from billing management server 50 a HTTP Response for the concerned HTTP Request.

Specifically, as shown in FIG. 6, gateway server 40 transmits to billing management server 50, FIN requesting TCP Connection Close via TCP Connection B1 (step S206). Billing management server 50, upon receiving FIN, transmits ACK to gateway server 40 via TCP Connection B1 (step S207). As a result, communication for transmitting data in a direction from gateway server 40 to billing management server 50 is discontinued, while communication for transmitting data in the direction from billing management server 50 to gateway server 40 is maintained (i.e., a half-closed state).

Further, after billing management server 50 transmits ACK to gateway server 40 in step S207, TCP Connection B2 with content server 70 is released. Specifically, billing management server 50 transmits to content server 70 FIN, requesting TCP Connection Close via TCP Connection B2 (step S601). In response to the received FIN, content server 70 transmits ACK to billing management server 50 via TCP Connection B2, and transmits FIN requesting TCP Connection Close at the same time (step S602). Billing management server 50, upon receiving FIN requesting TCP Connection Close, transmits ACK to content server 70 via TCP Connection B2 (step S603). As a result, TCP Connection B2 is closed.

A case may occur wherein billing management server 50 has already received from content server 70 a HTTP Response including content at the time of receiving, from gateway server 40, FIN requesting TCP Connection Close in the above step S206. In such a case, billing management server 50 determines, on the basis of the concerned HTTP Response and stored information (billing management information), a billing option and the like to be applied to the HTTP communication. Billing management server 50 then inserts in the extension header of the HTTP Response billing information specifying the billing option and the like for transmission to gateway server 40 (step S208).

In a case that billing management server 50 has not received from content server 70 a HTTP Response including content at the time of receiving from gateway server 40 FIN requesting TCP Connection Close in the above step S206, billing management server 50 determines, on the basis of the concerned HTTP Request and stored information (billing management information), a billing option to be applied to HTTP Request transmitted from portable phone 10. Billing management server 50 then generates a HTTP Response with no content included, and inserts billing information including the determined billing option and the like in the extension header of the Response for transmission to gateway server 40 (step S208).

Gateway server 40, upon receiving the HTTP Response, stores the billing information inserted in the extension header. Since TCP Connection A has already been released, gateway server 40 abandons data of HTTP Response after storing the billing information in its memory.

On the other hand, billing management server 50, after transmitting a HTTP Response, transmits to gateway server 40 FIN for terminating the half-closed TCP Connection B1 (step S209). Gateway server 40, when it receives FIN from billing management server 50, returns ACK to billing management server 50 (step S210), thereby terminating HTTP communication. By the process performed in the above steps S209 and S210, TCP Connection BI is released.

Next, description will be given, with reference to FIGS. 7 and 8, of an operation of portable phone 10, gateway server 40, and billing management server 50 in the above-described case (2), i.e., in a case that a packet link in mobile packet communication network 100 is disconnected during HTTP communication. In the figures, signals transmitted and received using a U-Plane protocol are designated by solid lines, and signals transmitted and received using a C-Plane protocol are designated by dashed lines. Also, in the figures, the same steps as those shown in FIGS. 5 and 6 are assigned the same numbers, and description thereof is omitted.

TCP Connection A is first established between portable phone 10 and gateway server 40 by the process of steps S201 to S204, and TCP Connection B is established between gateway server 40 and content server 70 (not shown in FIG. 7). By way of TCP Connection A and TCP Connection B, a HTTP Request is transmitted from portable phone 10 to content server 70.

After portable phone 10 transmits the HTTP Request, TCP Connection A may be disconnected before gateway server 40 receives a HTTP Response to the HTTP Request, as a natural result of a disconnection of a wireless link due to portable phone 10 moving outside the communication range (including a case where portable phone 10 is located within a service area but is located underground where it is not accessible by radio) or when a battery of portable phone 10 is exhausted, or because of connection congestion, or a failure, such as a malfunctioning of a device in a wireless zone or in a wired zone within mobile packet communication network 100.

For example, in a case that a wireless link between portable phone 10 and base station 20 is disconnected, a disconnection notification notifying disconnection of the wireless link is transmitted to gateway server 40 from base station 20 via gateway switching station 30. The disconnection notification is a control signal transmitted by a C-Plane protocol, NWMP. Similarly, in a case that congestion or a failure occurs in mobile packet communication network 100, a relay node (e.g. base station 20, gateway switching station 30, subscriber switch station (not shown)) detecting connection congestion or a failure transmits a disconnection notification to gateway server 40 using NWMP.

In FIGS. 7 and 8, gateway server 40, upon receiving the disconnection notification (step S301), releases TCP Connection A. It is to be noted that portable phone 10 has a function to detect disconnection of a packet link, whereby TCP Connection A established with gateway server 40 is released in a case of detecting a disconnection of a packet link.

Gateway server 40 also transmits, according to NWMP, a disconnection notification response to a relay node which has transmitted the disconnection notification (step S302), and transmits, according to GMP, to billing management server 50 a release notification notifying that TCP Connection A has been released (step S303).

In the meantime, gateway server 40, billing management server 50, and content server 70 perform steps S206 to S211, shown in of FIGS. 7 and FIG. 8, and steps S601 to S603, shown in FIG. 8, responsive to the release of TCP Connection A. Specifically, TCP Connection B1 enters a half-closed state, and TCP Connection B1 is maintained until gateway server 40 receives a HTTP Response from billing management server 50. Gateway server 40 also transmits an amount of packet data transmitted to and received from portable phone 10 using a U-Plane protocol, as well as the billing information, to billing processing device 80. Then, billing processing device 80 performs, on the basis of the packet data amount and the billing information, a billing process for the HTTP communication up to the time of the disconnection. Communication charges are then computed in accounting center 90.

As stated in the foregoing description, in the present embodiment, in the case that gateway server 40 detects discontinuation of TCP Connection A between portable phone 10 and gateway server 40 when relaying HTTP communication between portable phone 10 and content server 70, TCP Connection B1 is maintained until gateway server 40 receives, from billing management server 50, billing information for the HTTP Communication up to the time that the TCP Connection A is disconnected.

Thus, even in a case that HTTP communication is prematurely disconnected, correct billing relative to an amount of data transmitted in HTTP communication up to the time of the disconnection can be carried out in mobile packet communication network 100.

It is to be noted that in this example gateway server 40 executes the process described above on the basis of a program stored in the memory of gateway server 40. However, a program for executing such a process may be obtained by gateway server 40 via communication. Further, such a program may be provided to gateway server 40 by way of a recording medium such as an optical recording medium, a magnetic recording medium, a semiconductor memory, and the like.

B. Modifications

In the foregoing description, different embodiments of the present invention have been described. However, it will be understood by one skilled in the art that the present invention may be implemented in various other ways without departing from the essential idea and features described of the present invention. Namely, each of the above-described embodiments represents a mere example of the present invention, and the actual scope of the present invention is defined by the recitations in the appended claims. Further, it is to be understood that any modification within the range of equivalency as applied to the appended claims is included in the scope of the present invention. Example modifications are described in the following.

First Modification:

In the above-described embodiment, TCP Connection B1 enters a half-closed state; and TCP Connection B2 enters a closed state, as shown in steps S206 to S211 of FIGS. 5 to 8 and steps S601 to S603 of FIGS. 6 and 8. However, TCP Connection B1 need not necessarily enter a half-closed state, and any type of connection state is accepted if communication in the direction from billing management server 50 to gateway server 40 is maintained until gateway server 40 receives, from billing management server 50, billing information for the HTTP communication up to the time that TCP Connection A was disconnected, in a case that discontinuation of TCP Connection A is detected during HTTP communication. Therefore, TCP Connection B may be maintained until gateway server 40 receives a HTTP Response from billing management server 50. It is also accepted that, instead of entering only TCP Connection B1 into a half-closed state, the entire TCP Connection B may be entered into a half-closed state.

FIG. 9 and FIG. 10 relate to the first modification of the present invention, and consist of a sequence chart showing an operation of each unit of communication system 1 in a case that TCP Connection B is maintained until gateway server 40 receives a HTTP Response from billing management server 50. It is to be noted that in FIGS. 9 and 10 signals transmitted and received using a U-Plane protocol are designated by solid lines, and signals transmitted and received using a C-Plane protocol are designated by dashed lines. Also, in the following, description of portions that are the same as those described relative to FIGS. 4 to 8 will be simplified.

FIG. 9 is a chart illustrating a case where termination of HTTP communication is instructed by a user of portable phone 10, by an operation input, during HTTP communication between portable phone 10 and content server 70. In FIG. 9, the process of steps S401 to S406 is the same as that of the steps S101 to S106 shown in FIG. 4.

Gateway server 40 of the present first modification has a timer for counting time from when it transmits to billing management server 50 a HTTP Request received from portable phone 10 until it receives a HTTP Response from billing management server 50; and releases TCP Connection B in a case that the counted time by the timer exceeds a prescribed time (a timeout value) stored in advance in the memory. It is to be noted that the above timeout value is set sufficiently larger (e.g. 10 minutes) than the timeout value waiting for HTTP Response (e.g., 5 minutes) counted by billing management server 50.

Gateway server 40, after it transmits HTTP Request to billing management server 50 in step S405, starts counting time by the above timer (step S407) so as to count time until it receives HTTP Response from billing management server 50.

In the present first modification, gateway server 40 is characterized in that, in the case of detecting discontinuation of TCP Connection A before the time counted by the above timer exceeds the timeout value, server 40 maintains TCP Connection B until it receives HTTP Response from billing management server 50 or the counted time exceeds the timeout value.

In other words, in a case that gateway server 40 receives TCP Connection Close from portable phone 10 without the time counted by the above timer having exceeded the timeout value and without receiving HTTP Response from billing management server 50 (step S408), portable phone 10 and gateway server 40 first release TCP Connection A.

Subsequently, gateway server 40 maintains TCP Connection B until it receives HTTP Response from billing management server 50 or the time counted by the timer exceeds the timeout value. Then, once gateway server 40 receives HTTP Response from billing management server 50 (step S410), server 40 stores in the memory the billing information inserted in the extension header of the HTTP Response. Also, since TCP Connection A is already released and the HTTP Response cannot be transferred to portable phone 10, gateway server 40 abandons the HTTP Response after storing the billing information in the memory.

Subsequently, each of gateway server 40, billing management server 50 and content server 70 performs a process of releasing TCP Connection B (step S411), thereby terminating HTTP communication. Gateway server 40 also transmits the amount of the packet data transmitted to and received from portable telephone 10 using a U-Plane protocol and billing information to billing processing device 80 (step S412), billing processing device 80 performs, on the basis of the data amount and the billing information, a billing process for HTTP communication up to the time of the disconnection, and the communication charge is computed at accounting center 90.

FIG. 10 is a sequence chart illustrating a case where a packet link in mobile packet communication network 100 is disconnected during HTTP communication performed between portable phone 10 and content server 70. It is to be noted that in the figure, the same step numbers are assigned to the same steps as those of FIG. 9, and description thereof will be omitted. It is also to be noted that the process from steps S501 to S503 of the figure is the same as the process of steps S301 to S303 of FIG. 7 and FIG. 8, and description thereof will be simplified.

Gateway server 40, after transmitting, to billing management server 50, a HTTP Request received from portable phone 10 in step S405, starts counting time by the timer (step S407). In a case that gateway server 40 receives, from base station 20, gateway switching station 30, or a subscriber switching station (not shown) or any other relay node of the packet link, a disconnection notification (NWMP) notifying a disconnection of a wireless link or a wired link in mobile packet communication network 100, without the time counted by the above timer having reached the timeout value and without receiving HTTP Response from billing management server 50 (step S501), gateway server 40 performs the process of releasing TCP Connection A.

In the meantime, gateway server 40 transmits a disconnection acknowledgement (NWMP) to a relay node which is the sender of the disconnection notification (step S502), and transmits, to billing management server 50, release notification (GMP) notifying the release of TCP Connection A (step S503). Gateway server 40 then maintains TCP Connection B until it receives HTTP Response from billing management server 50 or the time counted by the timer exceeds the timeout value, and performs the process of steps S409 to S412.

Second Modification:

In the above first modification, when gateway server 40 receives HTTP Response in step S410 of FIG. 9 and FIG. 10, it abandons data of the HTTP Response after obtaining billing information from the HTTP Response. This is because TCP Connection A has already been released, and HTTP Response cannot be transferred to portable phone 10.

However, TCP Connection A may have been disconnected for such a reason that a wireless link has temporarily been disconnected, in which case TCP Connection A can be restored after some time. In such a case, gateway server 40 may store HTTP Response received in step S410 without abandoning it, and, in a case that TCP Connection A is restored within a prescribed time period, gateway server 40 reads the HTTP Response stored in the memory for transmission to portable phone 10. The HTTP Response stored in the memory is deleted after a certain time period elapses since it was stored in the memory.

Third Modification:

In the above-described embodiment, billing information is inserted in the extension header of HTTP Response, but instead, may be added to HTTP Response transmitted from billing management server 50 to gateway server 40. Alternatively, the billing information may be related to HTTP Response and transmitted along with the related HTTP Response.

Fourth Modification:

In the above-described embodiments, TCP is used as a connection-oriented communication protocol; the connection-oriented communication protocol is not limited to TCP and can include other protocols such as SPX (Sequenced Packet eXchange) and X25. Further, connection-oriented communication is not limited to HTTP communication, and may include communication using other protocols such as FTP (File Transfer Protocol), SMTP (Simple Mail Transfer Protocol), and POP (Post Office Protocol).

Fifth Modification:

In the above-described embodiment, portable phone 10 is used as a communication terminal. However, the communication terminal is not limited to portable phone 10 and may be a PDA (Personal Digital Assistant), a mobile computer, a fixed personal computer, and the like, so long as the terminal has a function of performing wireless communication and is capable of performing connection-oriented communication via mobile packet communication network 100. Further, the communication system may be configured in such a way that gateway server 40 is provided outside mobile packet communication network 100. Still further, content server 70 may be directly connected to billing management server 50 via a dedicated line.

Sixth Modification:

In the above-described embodiment, used as an example of mobile packet communication network 100 is a network which conforms to IMT-2000, but mobile packet communication network 100 is not limited to a network conforming to IMT-2000. Further, the present invention is not limited for use in a mobile packet communication network and may be applied in any communication network that supports connection-oriented communication provided to subordinate communication terminal(s) if the network performs a billing for communication in accordance with the data amount and the like to bill a communication terminal.

The invention claimed is:

1. A communication control method comprising:

relaying by a transfer device connection-oriented communication performed between a communication terminal and a correspondent communication device, said connection-oriented communication being relayed over a first connection and a second connection, said first connection being between said transfer device and said correspondent communication device, and said second connection being between said transfer device and said communication terminal;

detecting a discontinuation of said second connection, said discontinuation of said second connection occurring before content transmitted from said correspondent communication device reaches said communication terminal, said content requested by said communication terminal;

maintaining said first connection at said transfer device at least between said transfer device and a billing management device in response to said discontinuation of said second connection occurring before receipt of billing information from said billing management device for said connection-oriented communication, said connection-oriented communication being relayed between said transfer device and said correspondent communication device over said first connection through said billing management device;

receiving said billing information at said transfer device from said billing management device over said first connection after said discontinuation of said second connection; and disconnecting said first connection at said transfer device in response to said receipt of said billing information at said transfer device from said billing management device over said first connection after said discontinuation of said second connection.

2. A communication control method according to claim 1 further comprising:

transmitting, in response to said receipt of said billing information, from said transfer device to an accounting management device, an amount of data transmitted to and received from said communication terminal during a period in which said transfer device relayed said connection-oriented communication, and said billing information received from said billing management device; and billing, at said accounting management device, for communication services for said connection-oriented communication based on said amount of data and said billing information.

3. A communication control method of claim 1, further comprising opening the first and second connections before said transfer device relays the connection-oriented communication.

4. A transfer device comprising:

a processor; and a memory comprising instructions executable by the processor, which, when executed by the processor, cause the processor to:

relay connection-oriented communication between a communication terminal and a correspondent communication device over a first connection and a second connection, said first connection being between said transfer device and said correspondent communication device, and said second connection being between said transfer device and said communication terminal; and detect a discontinuation of said second connection, wherein said discontinuation of said second connection occurred before a response from said correspondent communication device reached said communication terminal, the response including content requested by the communication terminal;

maintain said first connection at least between said transfer device and a billing management device in response to a failure to receive billing information from said billing management device for said connection-oriented communication upon detection of said discontinuation of said second connection, said billing management device being a relay node of said first connection between said transfer device and said correspondent communication device; and disconnect said first connection in response to receipt of said billing information from said billing management device over said first connection after said discontinuation of said second connection.

5. A transfer device according to claim 4, wherein said billing information is transmitted to said transfer device when said billing management device transmits to said transfer device a response message responsive to a request message transmitted from said communication terminal.

6. A transfer device according to claim 4, wherein said billing information is information specifying a billing option to be applied to said connection-oriented communication from among a plurality of types of billing options applicable to communication performed via said transfer device.

7. A transfer device according to claim 4,
wherein the instructions, when executed by the processor, further cause the processor to receive a signal, during a relaying of said connection-oriented communication by said transfer device, said signal indicating a disconnection of a link established between said communication terminal and said transfer device, said signal received from a relay node located in a path of the link, the second connection being established over the link, and receipt of said signal indicating a detection of said discontinuation of said second connection.

8. A transfer device according to claim 4,
wherein detection of said discontinuation of said second connection, during a relaying of said connection-oriented communication by said transfer device, is based on receipt of a request for disconnecting the second connection from said communication device.

9. A transfer device according to claim 4, wherein the instructions further cause the processor to:
measure an amount of data transmitted to and received from said communication terminal; and
transmit, in response to receipt of the billing information from said billing management device over said first connection, to an accounting management device for computing communication charges for said communication terminal, said billing information and said amount of data.

10. A transfer device according to claim 9,
wherein the amount of data transmitted to and received from said communication terminal excludes control signal data used for controlling said second connection.

11. A transfer device according to claim 4,
wherein said transfer device is a gateway server.

12. A computer readable recording medium which stores a program for causing a transfer device to execute:
a process of relaying connection-oriented communication performed between a communication terminal and a correspondent communication device over a first connection and a second connection, said first connection being between said transfer device and said correspondent communication device, and said second connection being between said transfer device and said communication terminal;
a process of detecting a discontinuation of said second connection, said discontinuation of said second connection occurring before a response requested by said communication terminal reaches said communication terminal;
a process of maintaining said first connection at said transfer device at least between said transfer device and a billing management device in response to a failure to receive billing information for said connection-oriented communication from said billing management device upon detection of said discontinuation of said second connection, said billing management device being a relay node of said first connection between said transfer device and said correspondent communication device; and
a process of disconnecting said first connection in response to receipt of the billing information at said transfer device from said billing management device over said first connection after said discontinuation of said second connection.

13. A communication control method for controlling communication between a communication terminal and a correspondent communication device, the communication control method comprising:

establishing a first connection between a transfer device and a billing management device;
establishing a second connection between the transfer device and the communication terminal;
relaying, through each of the transfer device, the first connection and the second connection, connection-oriented communication performed between the communication terminal and the correspondent communication device;
maintaining the first connection, upon detecting a discontinuation of the second connection without receipt of billing information for the connection-oriented communication from the billing management device over the first connection, the discontinuation of the second connection occurring before a response including content from said correspondent communication device reaches said communication terminal; and
disconnecting the first connection in response to receipt of the billing information from the billing management device over the first connection at the transfer device after said discontinuation of said second connection.

14. A communication control method according to claim 13 further comprising:
transmitting, in response to receipt of the billing information from said billing management device over said first connection, from the transfer device to an accounting management device, the billing information and an amount of data transmitted to and received from the communication terminal during a period in which the transfer device relayed the connection-oriented communication; and
billing, at the accounting management device, for communication services for the connection-oriented communication on the basis of the amount of data and the billing information.

15. A communication control method according to claim 13, further comprising:
measuring an amount of data transmitted to and received from the communication terminal; and
transmitting, to an accounting management device for computing communication charges for the communication terminal, the amount of data measured and the billing information received from the billing management device.

16. A transfer device for controlling communication between a communication terminal and a correspondent communication device, the transfer device comprising:
a processor; and
a memory comprising instructions executable by the processor, which, when executed by the processor, cause the processor to:
establish a first connection between the transfer device and the correspondent communication device, the first connection being over a billing management device between the transfer device and the correspondent communication device;
establish a second connection between the transfer device and the communication terminal;
relay, through the transfer device, the first connection, and the second connection, connection-oriented communication performed between the communication terminal and the correspondent communication device;
maintain the first connection when the transfer device detects a discontinuation of the second connection absent receipt of billing information for the connection-oriented communication from the billing management device, wherein said discontinuation of said second connection occurred before at least a portion of the connection-oriented communication from said correspondent communication device reached said communication terminal; and disconnect the first connection in response to receipt of the billing information from said billing management device over the first connection after said discontinuation of said second connection.

17. A transfer device according to claim 16, wherein the instructions further cause the processor to transmit, in response to receipt at the transfer device of the billing information from said billing management device over said first connection, to an accounting management device, the billing information and an amount of data transmitted to and received from the communication terminal during a period in which the transfer device relayed the connection-oriented communication.

18. A transfer device according to claim 17, wherein the accounting management device bills for communication services for the connection-oriented communication on the basis of the amount of data and the billing information.

19. A transfer device according to claim 16, wherein the instructions further cause the processor to detect the discontinuation of the second connection, during a relaying of the connection-oriented communication by the transfer device, based on receipt of a signal indicating a disconnection of a link established between the communication terminal and the transfer device, the signal received from a communication relay node located in a path of the link, the link being used for the connection-oriented communication.

20. A transfer device according to claim 16, wherein the instructions further cause the processor to detect the discontinuation of the second connection, during a relaying of the connection-oriented communication by the transfer device, based on receipt of a request for disconnecting the first connection, the request for disconnecting received from the communication terminal.

21. A transfer device according to claim 16, wherein the transfer device is a gateway server, and the instructions further cause the processor to:

measure an amount of data transmitted to and received from the communication terminal; and transmit, to an accounting management device for computing communication charges for the communication terminal, the amount of data measured and the billing information received from the billing management device.

* * * * *